United States Patent [19]

Buckingham et al.

[11] Patent Number: 4,801,918
[45] Date of Patent: Jan. 31, 1989

[54] ARROW BOARD

[76] Inventors: Danny W. Buckingham, 12 Chatsmere Place, Scarborough, Ontario, Canada, M1H 2G9; Svend R. De Bruyn, Bloomington Road, R. R. #4, Stouffville, Ontario, Canada, L0H 1L0

[21] Appl. No.: 112,446

[22] Filed: Oct. 26, 1987

[30] Foreign Application Priority Data

Jul. 24, 1987 [CA] Canada .................................. 542907

[51] Int. Cl.$^4$ .............................................. E01F 9/00
[52] U.S. Cl. .............................. 340/114 B; 340/81 R; 40/612; 40/590; 116/63 P
[58] Field of Search ............... 340/109, 114 R, 114 B, 340/120, 121, 122, 123, 127, 128, 129, 130, 131, 139, 140, 138, 132, 133, 331, 783, 763, 764, 90, 81 R, 82; 40/612, 550, 590, 464, 486, 487, 488–492, 497, 530, 532, 535, 537, 579, 580, 576, 575; 116/63 P, 63 R

[56] References Cited

U.S. PATENT DOCUMENTS

| | | | |
|---|---|---|---|
| 1,199,545 | 9/1916 | Hammond | 340/109 |
| 1,976,213 | 10/1934 | Briechle | 514/489 |
| 1,992,827 | 2/1935 | Kunneke | 340/109 |
| 2,081,790 | 5/1937 | Braun | 340/109 |
| 2,141,188 | 12/1938 | Arbuckle | 340/108 |
| 2,186,000 | 1/1940 | Arbuckle | 340/87 |
| 2,214,275 | 9/1940 | Hart | 40/491 |
| 3,553,645 | 1/1971 | Finkel | 340/110 |
| 3,622,980 | 11/1971 | Elledge | 340/109 |
| 3,883,846 | 5/1975 | Bruner | 340/109 |
| 4,087,785 | 5/1978 | Dodich | 340/114 B |
| 4,094,083 | 6/1978 | Fund | 40/590 |
| 4,152,854 | 5/1979 | Berry | 340/109 |
| 4,163,332 | 8/1979 | Salam | 340/764 |
| 4,318,238 | 3/1982 | Macarle, Jr. | 40/612 |
| 4,593,265 | 6/1986 | McKenney | 340/109 |
| 4,731,945 | 3/1988 | Howard | 40/491 |

FOREIGN PATENT DOCUMENTS

| | | | |
|---|---|---|---|
| 3416852 | 11/1985 | Fed. Rep. of Germany | 40/492 |
| 423556 | 5/1967 | Switzerland | 116/63 R |
| 523745 | 7/1940 | United Kingdom | 116/63 P |

Primary Examiner—Joseph A. Orsino
Assistant Examiner—Jill D. Jackson
Attorney, Agent, or Firm—Ridout & Maybee

[57] ABSTRACT

This invention relates to an arrow board. The arrow board comprises a cabinet having an operative face and a rhomboidal array of lamps arranged in the operative face. A wing board is hingedly attached to the operative face at its transverse medial line. The wing board defines a mask for the lamps and is movable from a first position, in which it extends across the operative face on one side of the board to define an arrow configuration of exposed lamps pointing in one direction, to a second position on the other side of the face in which it defines an arrow configuration of exposed lamps pointing in the other direction.

18 Claims, 4 Drawing Sheets

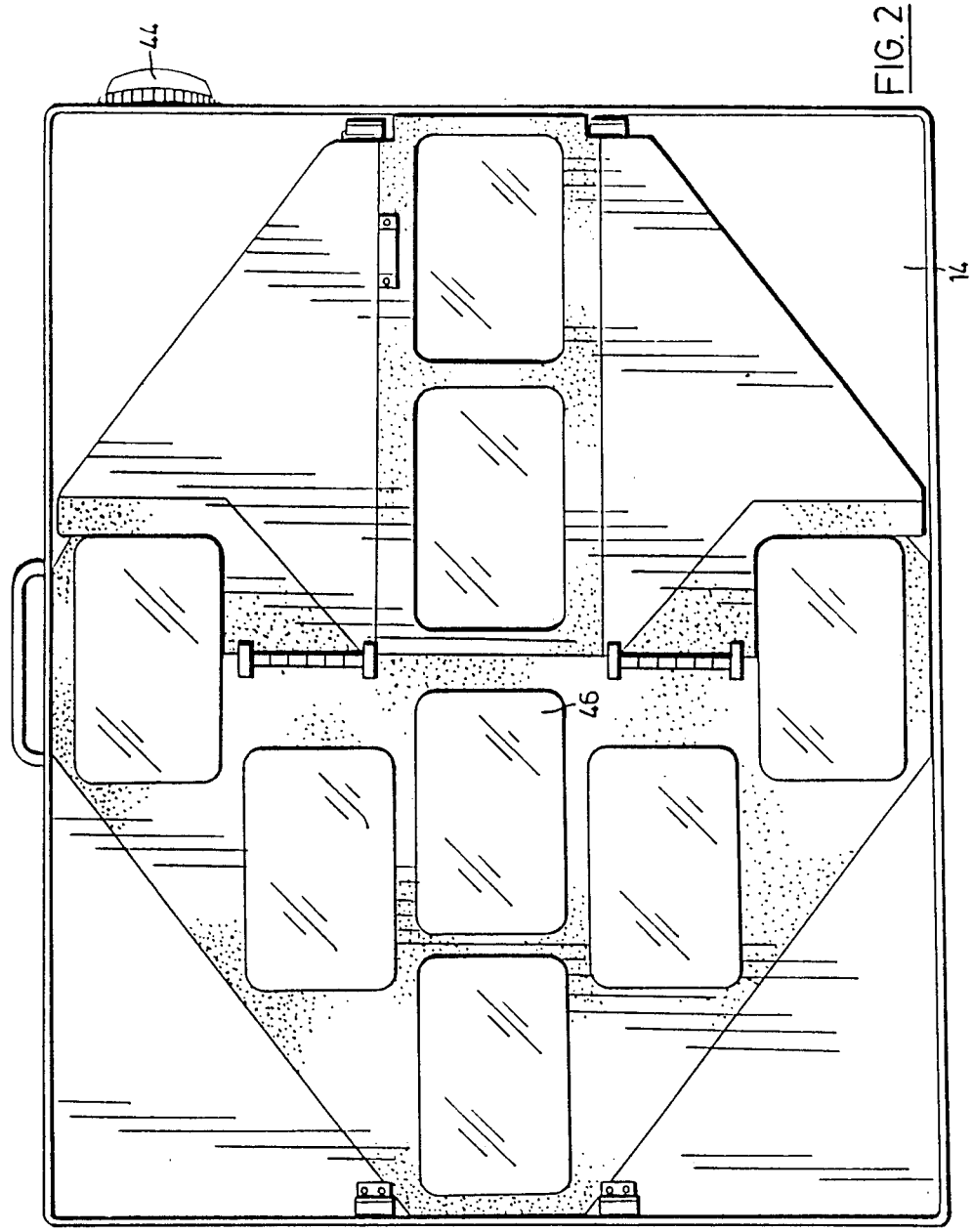

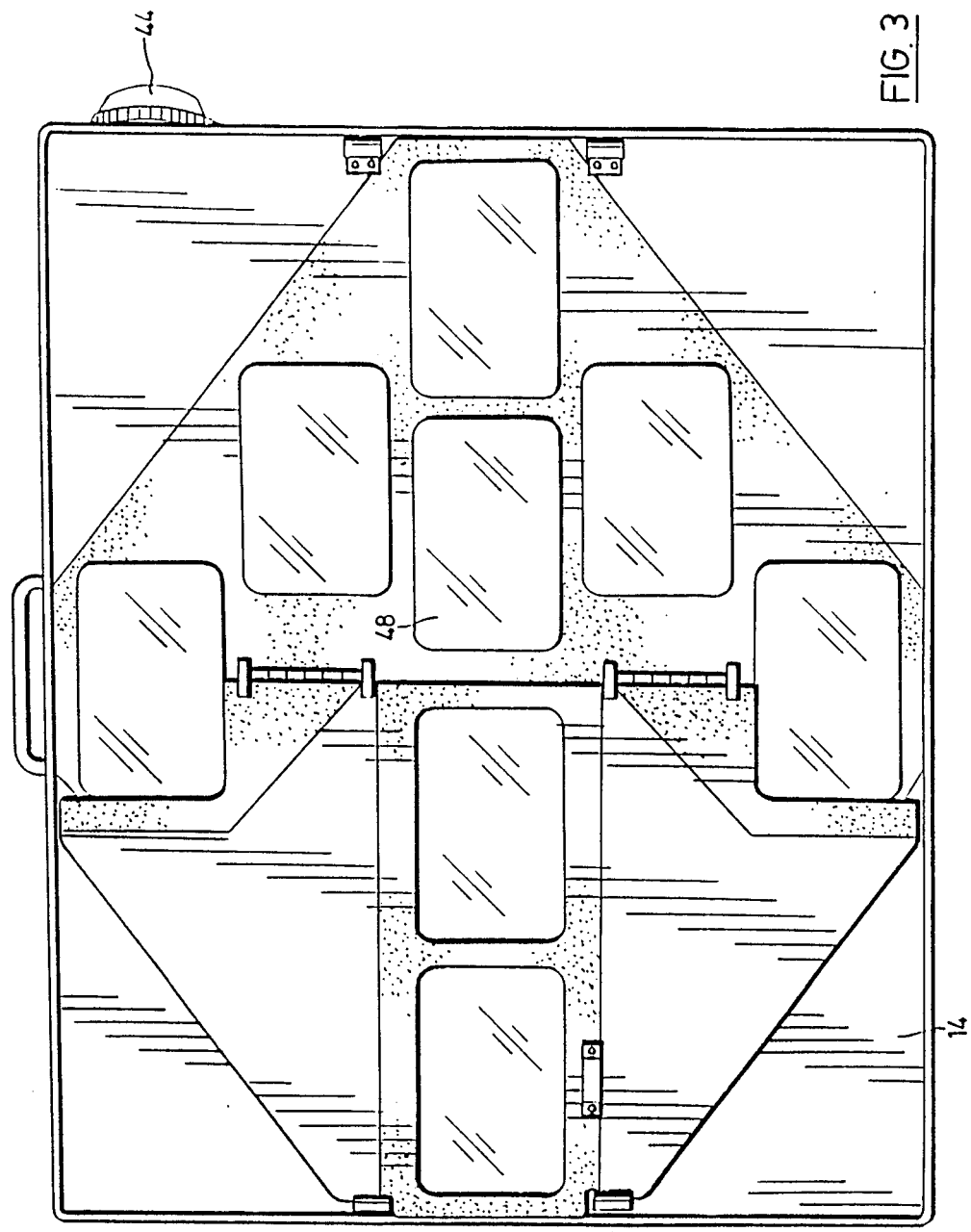

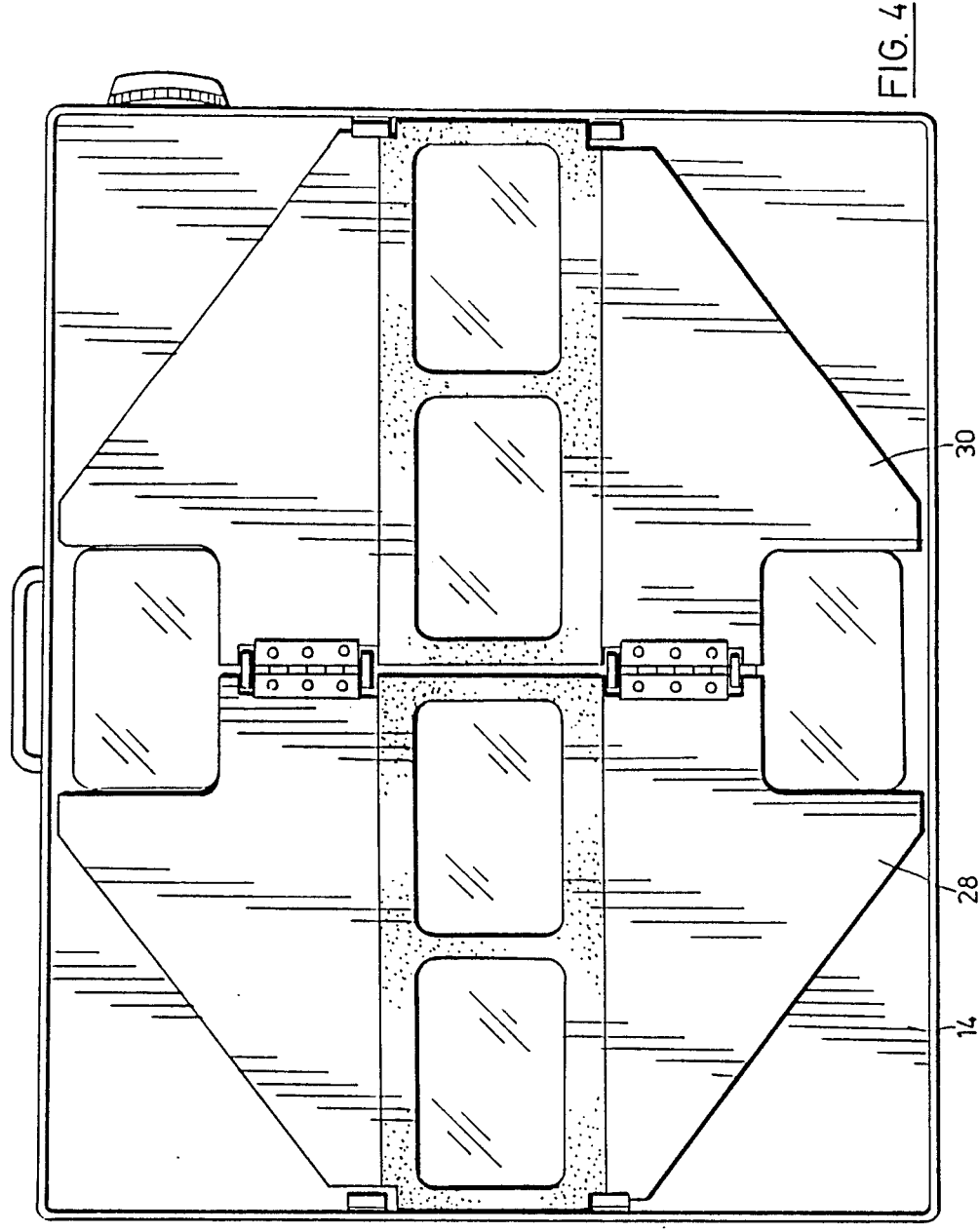

ARROW BOARD

FIELD OF THE INVENTION

This invention relates to an arrow board, particularly, but not exclusively, to an arrow board suitable for mounting on vehicles.

BACKGROUND TO THE INVENTION

An arrow board is a sign board having an arrowhead visibly featured on it. The arrowhead may be formed by reflective material or flashing lamps. Arrow boards are used to warn motorists of obstructions in the road and to direct the motorists around these obstructions. These obstructions may be road work crews, utility vehicles and the like.

Arrow boards are known in the art. In U.S. Pat. No. 3,622,980 an arrow board is disclosed in which a plurality of lamps are mounted on a board and are arranged in two interleaved groups. Each group defines at least three arrowheads aligned behind one another, with the arrowheads in each group being opposed in direction. The arrow board is mounted on a truck or trailer and is powered by a portable generator or by the truck's alternator. In use, the lamps forming an arrowhead flash on in succession for each arrowhead in the group. A similar device is disclosed in U.S. Pat. No. 3,883,846 but having an arrangement of lamps which is slightly different.

A problem with the prior art arrow boards is the security of operation. The arrangement of lamps illuminated to create an arrowhead is generally controlled by a simple two-way switch or the like. Switching the switch in one direction creates an arrowhead in that direction while switching the switch in the opposite direction creates an arrowhead in the opposite direction. Therefore, it may occur that the switch is accidentally switched in the wrong direction without the operator becoming aware of the problem.

Accordingly, it is an object of this invention to provide an arrow board which at least overcomes some of the problems associated with the prior art.

SUMMARY OF THE INVENTION

This invention provides an arrow board comprising a cabinet having an elongate operative face, the cabinet housing a rhomboidal array of lamps arranged in a symmetrical configuration about a transverse medial line of the operative face and being directed outwardly of it, means for operating the lamps, and a wing board hingedly attached to the operative face for pivotal movement about the transverse medial line. The wing board defines a mask having a longitudinal row of apertures conforming to the positions of selected lamps of the array and being movable from a first position, in which it extends across the operative face on one side of the medial line for masking selected lamps of this side to define an arrow configuration of exposed lamps pointing in one direction, to a second position in which it extends across the operative face on the other side of the medial line for masking lamps on this other side to define an arrow configuration of exposed lamps pointing in the opposite direction.

In a preferred embodiment of the invention, two such wing boards are hingedly attached to the operative face of the cabinet about the transverse medial line for pivotal movement about this medial line, each wing board being movable from a first position in which it extends across the operative face on one side of the medial line to a second position in which it is superimposed on the other wing board, on the other side of the medial line, the wing boards being selectively movable to expose an arrow configuration of lamps pointing in one direction, an arrow configuration of lamps pointing in the other direction, or a bar configuration of lamps.

BRIEF DESCRIPTION OF THE DRAWINGS

One embodiment of the invention is described, by way of example only, in which:

FIG. 2 illustrates the arrow board with an arrowhead pointing to the left;

FIG. 3 illustrates the arrow board with an arrowhead pointing to the right; and

FIG. 4 illustrates the arrow board having the uncovered lamps forming a central bar.

DETAILED DESCRIPTION OF THE DRAWINGS

Figure 1:
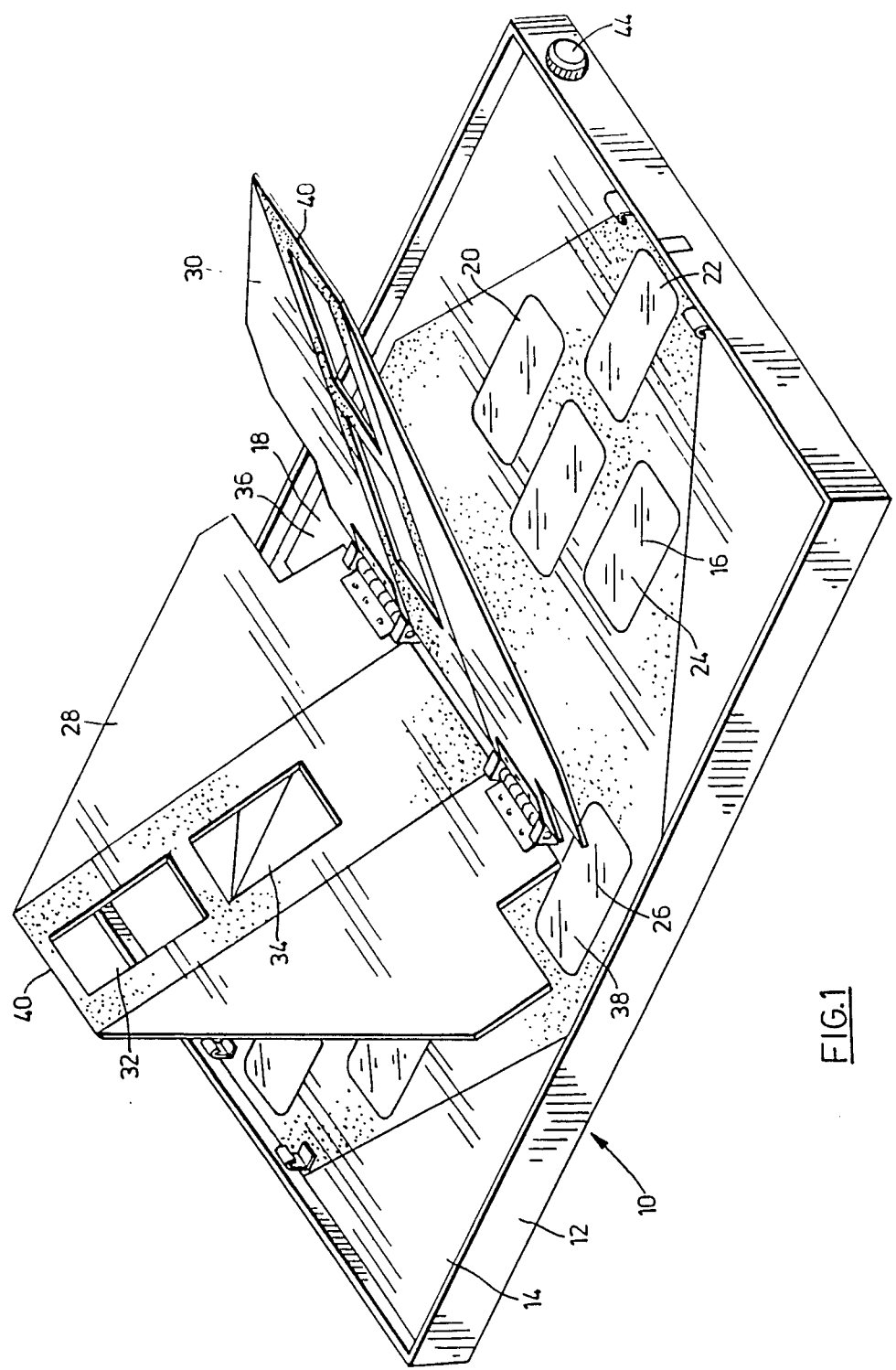
FIG. 1 illustrates the arrow board in perspective.

Referring to FIG. 1, an arrow board generally indicated by the numeral 10, is illustrated. The arrow board consists of a shallow, rectangular cabinet 12, a facing board 14, ten lamps 16 and two wing boards 28 and 30.

The shallow rectangular cabinet 12 is a shallow box which has means (not shown), such as peripheral flanges and the like, to which the facing board 14 may be secured. The facing board 14 forms the lid of the cabinet and the operative face of the arrow board. Both the cabinet 12 and the facing board are manufactured from 2.31 mm utility aluminium which has been anodized to provide protection against corrosion. However, any suitable, robust material may be used. The overall dimensions of the base are preferably not less than 0.6 m×0.76 m×0.1 m. Preferably, the facing board has dimension so as to form a close fitting lid to the cabinet 12.

Mounted into the facing board 14 are ten lamps 16. The lamps are symmetrically arranged in an array of five rows which are equidistantly spaced from one another to form a rhomboidal or diamond shape. A first row 18, which is adjacent one edge of the facing board, has a single lamp 16 centrally positioned about the transverse centreline or medial line of the facing board. A second row 20, which is positioned below the first row 18, has two lamps 16. These lamps are positioned, one on either side of the transverse centreline, approximately one lamp length apart. A third row 22 is positioned about the longitudinal centreline of the facing board 14. This third row has four lamps with a pair positioned on either side of the transverse centreline. The outermost lamp of each pair is positioned a small distance from the edge of the facing board 14 while the innermost of each pair is positioned a small distance from the transverse centreline. A fourth row 24 which is identical to the second row, is positioned below the third row. Finally, the fifth row 26, which is identical to the first row 18, is positioned below the fourth row and adjacent the edge of the facing board opposite the first row.

The lamps 16 are rectangular in shape and are preferably at least 9.53 cm (3.75 in) by 15.9 cm (6.25 in) in size. The lamps operate from a 12 volt power source and preferably draw a minimum of 55 watts each. The lamps issue amber light when illuminated. Also, when illuminated, the lamps preferably have sufficient beam spread to ensure a good intensity when viewed from all angles reasonably expected in use.

The two wing boards 28 and 30 are mirror images of each other and are each hingedly mounted at one of their edges to the facing board at its transverse centreline. Therefore, the wing boards may be swung from one side of the transverse centreline to the other. The wing boards 28 and 30 are substantially arrowheaded in shape but having a blunt point 40. The width of the blunt point 40 is at least as great at the width of the outermost lamp in each pair in the third row of lamps. A recess 36 and 38 is formed into the corners of the arrowhead adjacent the hingedly mounted edge. The recesses 36 and 38 correspond in position to the lamps of the first and fifth rows respectively so that, when the wing boards are laid on the facing board, the lamps of the first and fifth rows are not covered. Each wing board also has two apertures 32 and 34 formed into the stem of the arrowhead. These apertures are positioned to correspond in position to the pair of lamps on either side of the transverse centreline in the third row when the wing board is laid on the facing board. Therefore, when the wing boards are laid on the facing board, these lamps are not covered. The wing boards therefore provide a convenient mask for the lamps 16 to form any one of a right arrow, left arrow or centre bar. Preferably spring-loaded clips 42 and the like are positioned at the edges of the arrow board to engage and hold the arrowhead point 40 of each wing board.

An electronic controller (not shown) having a programmable chip is held securely within the cabinet 12. The controller is connected to the lamps 16 and a 12-volt power source. In use, the controller illuminates the correct arrangement of lamps to provide a flashing arrowhead. Preferably, a Detronics Model No. TES309 (Trade Mark) Controller manufactured by Detronics Limited is used. This controller illuminates the lamps 16 at 60 cycles per minute. Also, in the "off" part of the cycle, the lamps are fed just sufficient current to make the filament in each lamp just glow. This feature extends the life of the bulb in the lamp. The controller includes a circuit which adjusts the intensity of each activated lamp in accordance with ambient light levels. For example, the activated lamps need to be more intense during daylight hours than during the night to be visible. A photoelectric cell 44, which may be any known photoelectric cell, is secured in a side wall of the cabinet 12 and is connected to the controller. The controller uses the output from the photoelectric cell 44 to set the intensity of the lamps 16.

Switching means is included in the cabinet 12 to activate the controller to illuminate lamps forming an arrowhead pointing to the left, forming an arrowhead pointing to the right, or forming a centre bar. Preferably, two switches are used and both are activated by the wing boards 28 and 30. In this case, if both boards are superimposed and laid on one side of the medial line of the facing board 14, one switch is activated, if both boards are superimposed and laid on the other side of the medial line of the facing board 14, the other switch is activated, and if a wing board is laid on each side of the medial line of the facing board, both switches are activated. Then, if one switch is activated, an arrowhead pointing in the opposite direction is illuminated while if both switches are activated, a centre bar is illuminated. This is conveniently achieved by placing a magnetically activated switch, such as a Reed switch, adjacent both lateral edges of the facing board adjacent the spring-loaded clip 42. A magnet is then correspondingly positioned on each wing board. Closing the wing mounted magnet on the facing board adjacent the switch activates the switch. However, any suitable switching means may be used.

Referring now to FIG. 2, an arrowhead pointing to the left is illustrated. In this case, the wing boards 28, 30 are superimposed and are both laid on the righthand side of the facing board. All the lamps on the lefthand side of the board are uncovered while only those lamps in the first, third and fifth rows on the righthand side are uncovered. In this manner, the eight uncovered lamps form an arrowhead pointing to the left. Preferably, the controller illuminates seven of the eight uncovered lamps. The only uncovered lamp not illuminated is the lamp 46 which is the innermost lamp of the pair of lamps in the third row on the lefthand side of the board. The seven lamps flash on and off at sixty cycles per minute to create a highly visible arrowhead. The controller is activated to illuminate the seven lamps by a magnetically activated switch which is activated by the position of the wing boards 28 and 30 relative to the facing board 14.

Referring now to FIG. 3, an arrow pointing to the right is illustrated. In this case, wing boards are superimposed and are both laid on the lefthand side of the facing board 14. All the lamps on the righthand side of the board are uncovered while only those lamps in the first, third and fifth rows on the lefthand are uncovered. In this manner, the eight uncovered lamps form an arrowhead pointing to the right. Preferably, all the lamps 16 are illuminated except the lamp 48 which is the innermost lamp of the pair of lamps in the third row on the righthand side. A magnetically operated switch, which is activated by the position of the wing boards 28 and 30, relative to the facing board 14, activates the controller to illuminate the correct arrangement of lamps.

Referring now to FIG. 4, a centre bar is illustrated. In this case, one wing board 28 is laid on the left hand side of the facing board 14 while the other wing board 30 is laid on the right hand side of the facing board. In this way, only the lamps in the first, third and fifth rows are left uncovered. One magnetically activated switch is activated by the magnet mounted on wing board 28 on the left hand side while the other magnetically activated switch is activated by the magnet mounted on wing board 30 on the right hand side. The output from both switches to the controller causes the controller to activate only the four lights in the third row. In this manner, a flashing centre bar is obtained.

In use, the arrow board may be attached to the back or roof of a truck or trailer in a highly visible manner. The power source for the lamps 16, controller and switches is the truck's alternator, battery or a portable generator. To this aim, the arrow board is provided with an insulated electric cable which is attached to suitable common terminals (not shown) in the cabinet 12 of the arrow board. The other end of the cable may be attached to suitable power points in the truck or on the portable generator. The arrow board circuitry may include reverse polarity protection and protection against transient voltage spikes which may develop in the truck's alternator or in the portable generator. The controller may also be programmed to illuminate the lamps in a sequence which creates an impression of a moving arrow.

Preferably, the facing board and wing boards are covered in suitable fluorescent and retro-reflective material common to all road signs. Preferably, the material is orange coloured and is arranged on the facing board and wing boards to accentuate the arrowheads or centre bar. In this regard, the fluorescent material is placed on the facing board around the diamond formed by the lamps 16. The facing board within the diamond is coloured non-reflective black. The wing boards are covered on both their sides by the fluorescent material except for a transverse central bar running about their apertures 32 and 34 which is coloured non-reflective black. Also, the inner side of each wing board includes areas of black colouring about each of their corner recesses 36 and 38.

The arrow board provides a convenient and highly visible means of directing traffic about an obstruction in the roadway. For example, the arrow board may be attached to the back of a utility vehicle which is stationary or slow moving. Also, by placing the wing boards correctly relative to the facing board 14, it is ensured that the correct arrowhead is visible to other motorists.

Although the preferred embodiment of an arrow board having a pair of wing boards and a controller is described, the invention operates adequately with a single wing board and without a controller. Where there is no controller, all the lamps are illuminated and the wing board or wing boards provide the correct masking.

I claim:

1. An arrow board comprising a cabinet having an elongate operative face, the cabinet housing a rhomboidal array of lamps arranged in a symmetrical configuration about a transverse medial line of the operative face and being directed outwardly of the face, means for operating the lamps, and a wing board hingedly attached to the operative face for pivotal movement about the transverse medial line of the face, the wing board defining a mask having a longitudinal row of apertures conforming to the positions of selected lamps of the array and being movable from a first position, in which it extends across the operative face on one side of the medial line for masking selected lamps of this side to define an arrow configuration of exposed lamps pointing in one direction, to a second position in which it extends across the operative face on the other side of the medial line for masking lamps on this other side to define an arrow configuration of exposed lamps pointing in the opposite direction.

2. An arrow board according to claim 1 in which a pair of the wing boards is hingedly attached to the operative face of the cabinet about the transverse medial line for pivotal movement about this medial line, each wing board being movable from a first position in which it extends across the operative face on one side of the medial line to a second position in which it is superimposed on the other wing board on the other side of the medial line, the wing boards being selectively movable to expose an arrow configuration of lamps pointing in one direction, an arrow configuration of lamps pointing in the other direction, or a bar configuration of lamps.

3. An arrow board according to claim 1 in which the means for operating the lamps includes a controller means which, when the wing board is in the first position, selectively illuminates the arrow configuration of exposed lamps, and when the wing board is in the second position, selectively illuminates the arrow configuration of exposed lamps pointing in the opposite direction.

4. An arrow board according to claim 2 in which the means for operating the lamps includes a controller means which, when the pair of wing boards is in the first position, illuminates the bar configuration of exposed lamps, and when the wing board is in a second position, selectively illuminates the arrow configuration of exposed lamps pointing in one direction.

5. An arrow board according to claim 3 in which the controller means includes two magnetically activated switches, one switch being located in the cabinet on one side of the medial line and the other switch being located in the cabinet on the other side of the medial line, the wing board having a correspondingly positioned magnet, and one of the switches being activated when the wing board, having a correspondingly positioned magnet, extends across the operative face on the switch's side of the medial line to activate the controller to illuminate a selected configuration of lamps.

6. An arrow board according to claim 1 in which the array of lamps comprises ten lamps arranged in five rows spaced equidistantly from one another.

7. An arrow board according to claim 6 in which the five rows comprise a first row having a single lamp positioned about the transverse medial line of the operative face adjacent its top edge, a second row having two lamps positioned one on either side of the transverse medial line of the operating face and below the first row, a third row having a pair of lamps positioned on either side of the transverse medial line of the operating face and below the second row, a fourth row identical to the second row and positioned below the third row, and a fifth row identical to the first row and positioned adjacent a bottom edge of the operative face.

8. An arrow board according to claim 7 in which the longitudinal row of apertures in the wing board corresponds in position to the pair of lamps in the third row on each side of the transverse medial line.

9. An arrow board according to claim 3 further comprising means for detecting the intensity of ambient light, the controller being responsive to the light-intensity detecting means and operable thereby for setting the intensity of the illuminated lamps.

10. An arrow board according to claim 3 in which the controller illuminates the lamps at 60 cycles per minute.

11. An arrow board according to claim 1 in which the operating face and the wing board includes a fluorescent and retro-reflective covering.

12. An arrow board according to claim 4 in which the controller means includes two magnetically activated switches, one switch being located in the cabinet on one side of the medial line and the other switch being located in the cabinet on the other side of the medial line, each wing board having a correspondingly positioned magnet, and one of the switches being activated when a wing board having a correspondingly positioned magnet extends across the operative face on the switch's side of the medial line to activate the controller to illuminate a selected configuration of lamps.

13. An arrow board according to claim 2 in which the array of lamps comprises ten lamps arranged in five rows spaced equidistantly from one another.

14. An arrow board according to claim 13 in which the five rows comprise a first row having a single lamp positioned about the transverse medial line of the operative face adjacent its top edge, a second row having two lamps positioned one on either side of the transverse medial line of the operating face and below the first row, a third row having a pair of lamps positioned on either side of the transverse medial line of the operating face and below the second row, a fourth row identical to the second row and positioned below the third row, and a fifth row identical to the first row and positioned adjacent a bottom edge of the operative face.

15. An arrow board according to claim 14 in which the longitudinal row of apertures in each wing board corresponds in position to the pair of lamps in the third row on each side of the transverse medial line.

16. An arrow board according to claim 4 further comprising means for detecting the intensity of ambient light, the controller being responsive to the light-intensity detecting means and operable thereby for setting the intensity of the illuminated lamps.

17. An arrow board according to claim 4 in which the controller illuminates the lamps at 60 cycles per minute.

18. An arrow board according to claim 2 in which the operating face and wing boards include a fluorescent and retro-reflective covering.

* * * * *